US008177894B2

(12) United States Patent
Yoshida et al.

(10) Patent No.: US 8,177,894 B2
(45) Date of Patent: May 15, 2012

(54) CANISTERS

(75) Inventors: Toshio Yoshida, Handa (JP); Tsuneyuki Kurata, Okazaki (JP); Norihisa Yamamoto, Aichi-ken (JP); Yukihiro Kaneda, Komaki (JP)

(73) Assignee: Aisan Kogyo Kabushiki Kaisha, Aichi-Ken (JP)

( * ) Notice: Subject to any disclaimer, the term of this patent is extended or adjusted under 35 U.S.C. 154(b) by 422 days.

(21) Appl. No.: 12/486,119

(22) Filed: Jun. 17, 2009

(65) Prior Publication Data

US 2009/0320685 A1 Dec. 31, 2009

(30) Foreign Application Priority Data

Jun. 27, 2008 (JP) ................................ 2008-168281

(51) Int. Cl.
*F02M 25/08* (2006.01)
*B01D 53/04* (2006.01)

(52) U.S. Cl. ........................................... 96/134; 55/511

(58) Field of Classification Search .................... 96/121, 96/134, 135; 95/146; 55/490, 509, 511; 123/519
See application file for complete search history.

(56) References Cited

U.S. PATENT DOCUMENTS

| | | | | |
|---|---|---|---|---|
| 4,598,686 | A * | 7/1986 | Lupoli et al. | 123/519 |
| 5,599,384 | A * | 2/1997 | Yoshida et al. | 96/143 |
| 6,383,268 | B2 * | 5/2002 | Oda | 96/134 |
| 6,524,374 | B2 * | 2/2003 | Moriyama et al. | 96/131 |
| 6,592,655 | B2 * | 7/2003 | Iriyama et al. | 96/138 |
| 6,773,491 | B1 * | 8/2004 | Bohl | 96/130 |
| 7,134,426 | B2 * | 11/2006 | Uchino et al. | 123/518 |
| 7,458,367 | B2 * | 12/2008 | Kasuya | 123/519 |

FOREIGN PATENT DOCUMENTS

| | | |
|---|---|---|
| JP | 718077 | 3/1995 |
| JP | 10227260 | 8/1998 |
| JP | 2000186635 | 7/2000 |
| JP | 2001317418 | 11/2001 |
| JP | 2001323846 | 11/2001 |
| JP | 2004060584 | 2/2004 |

* cited by examiner

*Primary Examiner* — Frank Lawrence, Jr.
(74) *Attorney, Agent, or Firm* — Dennison, Schultz & MacDonald

(57) ABSTRACT

A canister includes a canister case having an adsorbent chamber, an adsorbent housed in the adsorbent chamber of the canister case, a filter disposed between the adsorbent chamber and a port mounted on an end wall of the adsorbent chamber, and a tentative filter engaging projection provided in the adsorbent chamber. The filter is loosely fitted within the adsorbent chamber and then welded on the end wall of the adsorbent chamber. The tentative filter engaging projection tentatively holds the filter loosely fitted within the adsorbent chamber in a welding step of the filter.

13 Claims, 9 Drawing Sheets

CANISTERS

This application claims priority to Japanese patent application serial number 2008-168281, the contents of which are incorporated herein by reference.

BACKGROUND OF THE INVENTION

The present invention relates to canisters for adsorbing and desorbing vapor generated from fuel systems of engines in motor vehicles, etc.

Japanese Laid-Open Patent Publication No. 2000-186635 in the name of the applicant of this application discloses a canister. This canister has an adsorbent housed in an adsorbent chamber, a filter provided between the adsorbent chamber and a port provided on an end wall of the adsorbent chamber. The filter is welded on the end wall of the adsorbent chamber.

In sequence steps for mounting the filter on a canister case in the known canister, after the filter is provided in the adsorbent chamber, the filter is welded on the end wall of the adsorbent chamber. The filter is loosely fitted in the adsorbent chamber in order to facilitate proper installation of the filter in the adsorbent chamber. Thus, the filter is free between the time the filter is provided in the adsorbent chamber and the time the filter is welded, so that there is a case that the filter is lifted due to static electricity or the like and is unintentionally displaced. When the filter is displaced, failure in filter assembly may be caused, or complex management in automated lines is required. It is not preferred that when the failure in the filter assembly is severe, the adsorbent spills into the port. In addition, it is thought that displacement can be prevented by press fitting the filter in the adsorbent chamber, however a circumferential edge of the filter may turn up, and the edge turned up could cause problems in an assembly step, so that such press fitting is not preferred.

Therefore, there has been a need for improved canisters capable of preventing displacement of the filter between the time the filter is located and the time the filter is welded.

BRIEF SUMMARY OF THE INVENTION

One aspect according to the present invention includes a canister having a canister case having an adsorbent chamber, an adsorbent housed in the adsorbent chamber of the canister case, a filter disposed between the adsorbent chamber and a port mounted on an end wall of the adsorbent chamber, and a tentative filter engaging projection provided in the adsorbent chamber. The tentative filter engaging projection can hold the filter within the adsorbent chamber.

DETAILED DESCRIPTION OF THE INVENTION

Each of the additional features and teachings disclosed above and below may be utilized separately or in conjunction with other features and teachings to provide improved canisters. Representative examples of the present invention, which examples utilized many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
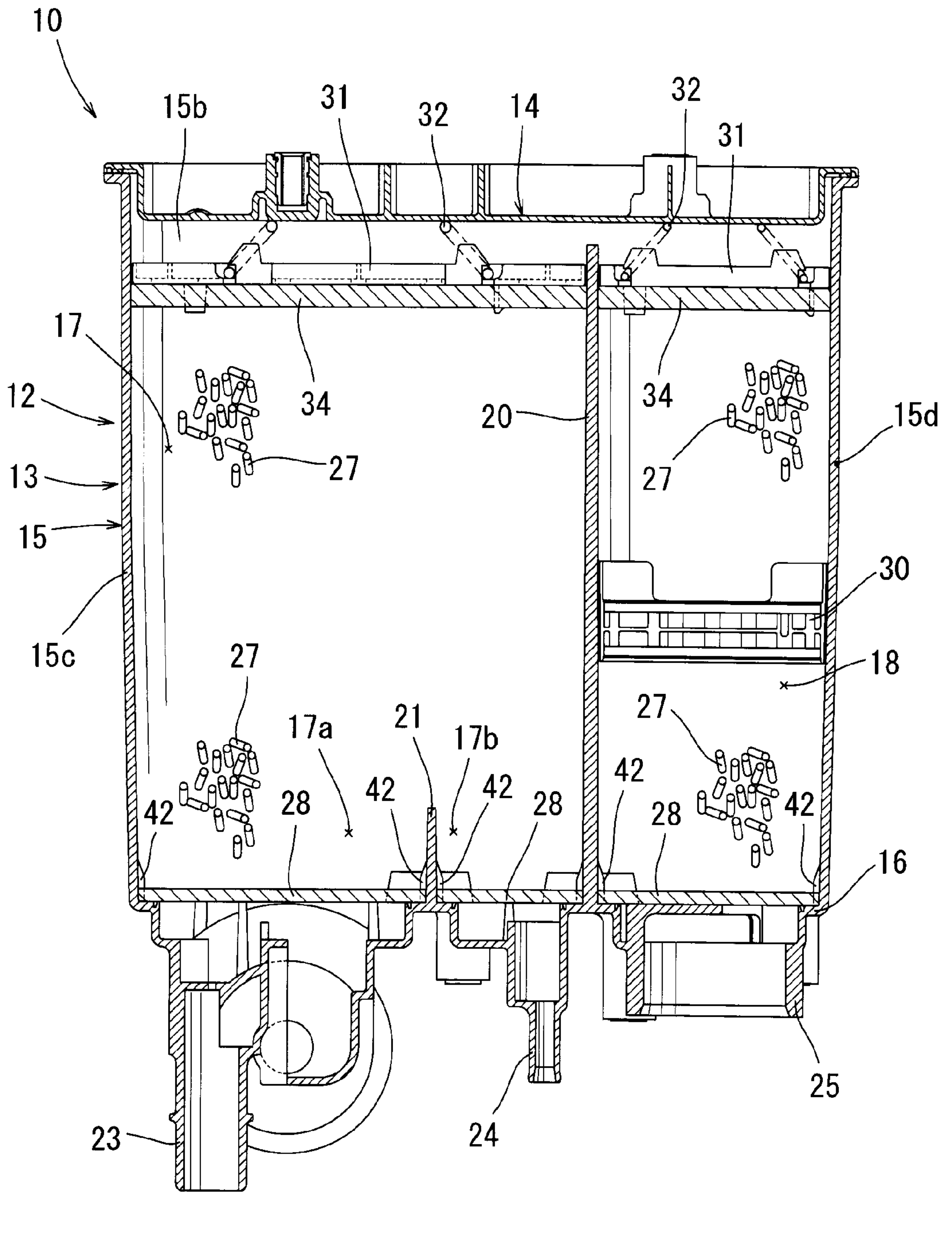
FIG. 1 is a cross sectional view of a canister according to an embodiment of the present invention.

With respect to directions of a canister, upper, lower, right and left directions are defined based on the orientation in FIG. 1, in addition, front and rear directions of a paper are defined as front and rear directions of the canister.

As shown in FIG. 1, a canister 10 has a canister case 12 that can be made from resin. The canister case 12 is composed of a cylindrical tubular case body 13 having an opening at an upper side and having a bottom at a lower side, and a cover plate 14 closing the opening of the case body 13.

Figure 2:
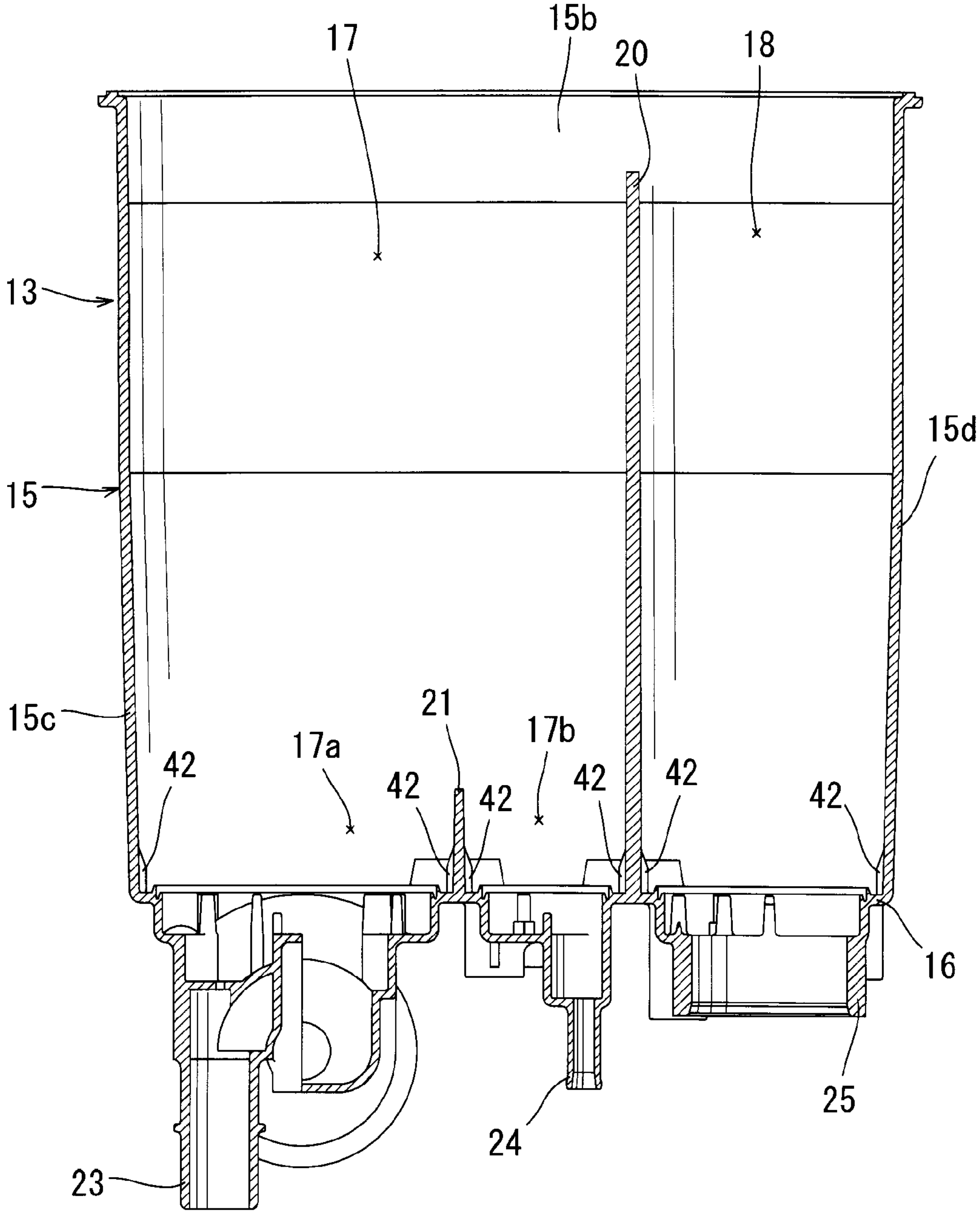
FIG. 2 is a cross sectional view of a case body.
Figure 3:
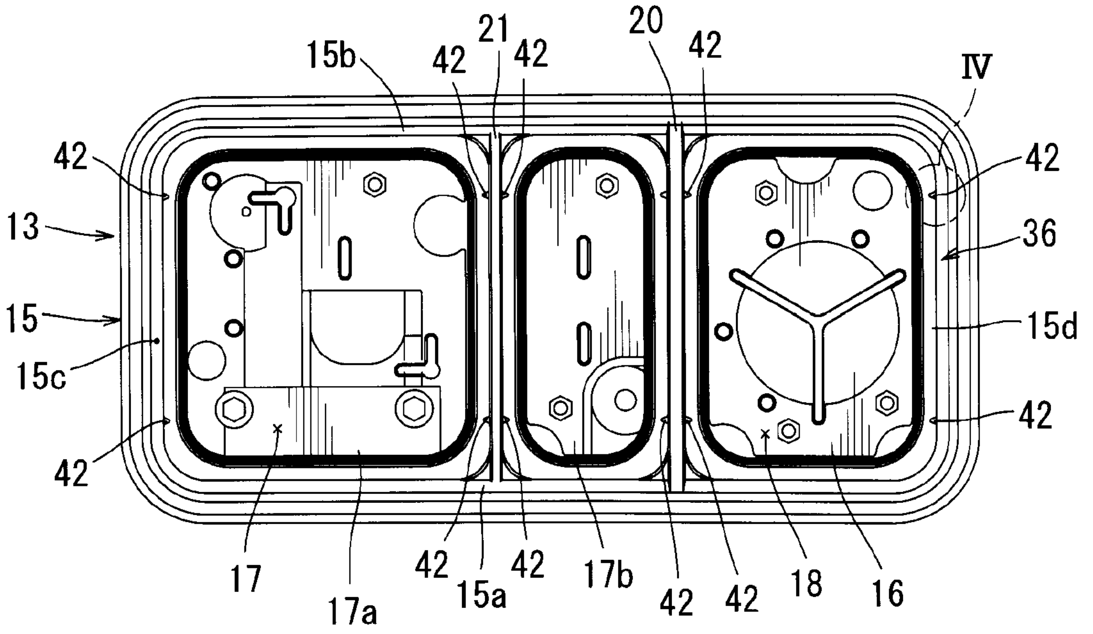
FIG. 3 is a plane view of the case body.

As shown in FIG. 3, the case body 13 has a square tubular shaped circumferential wall 15 composed of a front side wall 15*a*, a rear side wall 15*b*, a left side wall 15*c* and a right side wall 15*d*, and a bottom wall 16 (refer to FIG. 2). The circumferential wall 15 is formed in a substantial square tubular shape moderately expanding toward an upside from the bottom wall 16.

As shown in FIG. 2, a partition wall 20 is provided on the bottom wall 16 for dividing an inner space of the case body 13 into a first adsorbent chamber 17 positioned at left side and a second adsorbent chamber 18 positioned at right side. A partition 21 for dividing a lower section of the first adsorbent chamber 17 into a pair of right and left compartments 17*a* and 17*b* is formed on the bottom wall 16 of the first adsorbent chamber 17. A tank port 23, a purge port 24 and an atmospheric port 25 aligned with each other in a horizontal direction (right and left direction) are configured to protrude downwardly from the bottom wall 16 of the case body 13. The tank port 23 communicates the left compartment 17*a* in the first adsorbent chamber 17 with outside of the case. The purge port 24 communicates the right compartment 17*b* in the first adsorbent chamber 17 with outside of the case. The atmospheric port 25 communicates the second adsorbent chamber 18 with outside of the case.

As shown in FIG. 1, each of the adsorbent chambers 17 and 18 of the case body 13 is filled with an adsorbent for adsorbing vapor generated in a fuel tank. The adsorbent 27 is made of, for example, active carbon in particle shape. Breathable filters 28 are disposed between the bottom wall 16 of the case body 13 and the left compartment 17*a* of the first adsorbent chamber 17, between the bottom wall 16 and the right compartment 17*b* of the first adsorbent chamber 17, and between the bottom wall 16 and the second adsorbent chamber 18, respectively. A breathable buffer plate 30 for dividing the adsorbent 27 within the second adsorbent chamber 18 into upper and lower compartments is horizontally fitted within the second adsorbent chamber 18 such that the buffer plate 30 can be vertically moved while keeping a horizontal state. The bottom wall 16 can also be an "end wall" herein.

Breathable press plates 31 are horizontally fitted into openings at upper sides of the adsorbent chambers 17 and 18 so as to move in the vertical direction, respectively. Springs 32 for resiliently pressing the press plates 31 are disposed between the each press plate 31 and the cover plate 14, respectively. Both of the adsorbent chambers 17 and 18 communicate with each other through a space between the cover plate 14 and the partition wall 20. Breathable filters 34 in sheet shape are disposed between the press plates 31 and the adsorbent 27 in the adsorbent chambers 17 and 18, respectively.

Next, construction of a main part of the canister 10, that is, assembly structure of the filter 28 on the case body 13 of the canister case 12 will be described.

Assembly structures of the filters 28 on the compartments 17*a* and 17*b* of the first adsorbent chamber 17 and the second adsorbent chamber 18 are same, so that the assembly structure of the filter 28 on the second adsorbent chamber 18 will be described, and explanations as for assembly structures of the filters 28 on the compartments 17*a* and 17*b* of the first adsorbent chamber 17 are omitted.

A circumferential wall 36 of the second adsorbent chamber 18 is formed in a square tubular shape by the right side wall 15*d*, the partition wall 20, and parts of the front and rear side walls 15*a* and 15*b* between the right side wall 15*d* and the partition wall 20 in the circumferential wall 15 of the case body 13. A circumferential wall of the left compartment 17*a* of the first adsorbent chamber 17 is formed in a square tubular shape by the left side wall 15*c*, the partition 21, and parts of the front and rear side walls 15*a* and 15*b* between the left side wall 15*c* and the partition 21 in the circumferential wall 15 of the case body 13. And, a circumferential wall of the right compartment 17*b* of the first adsorbent chamber 17 is formed in a square tubular shape by the partition 21, the partition wall 20, and parts of the front and rear side walls 15*a* and 15*b* between the partition 21 and the partition wall 20 in the case body 13.

Figure 4:
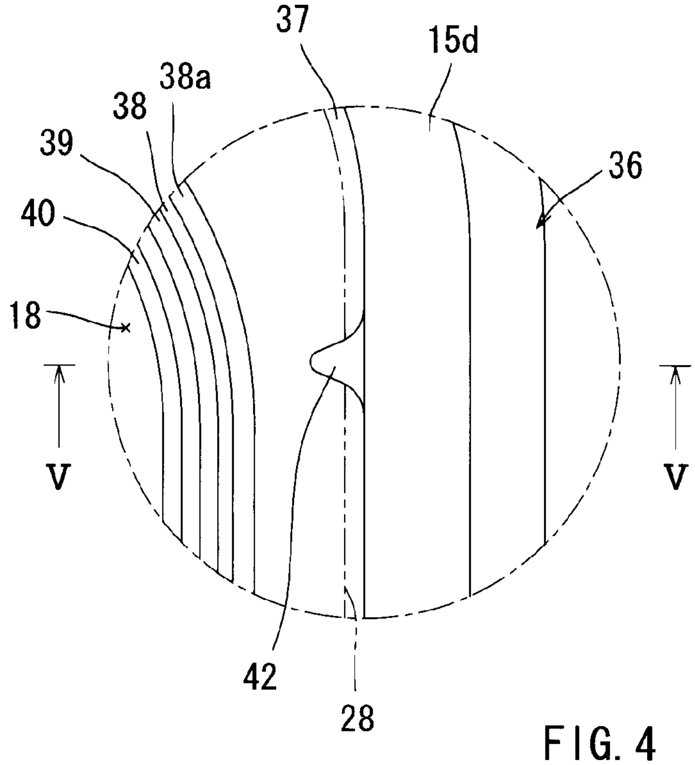
FIG. 4 is a plane view showing a portion IV in FIG. 3.
Figure 5:
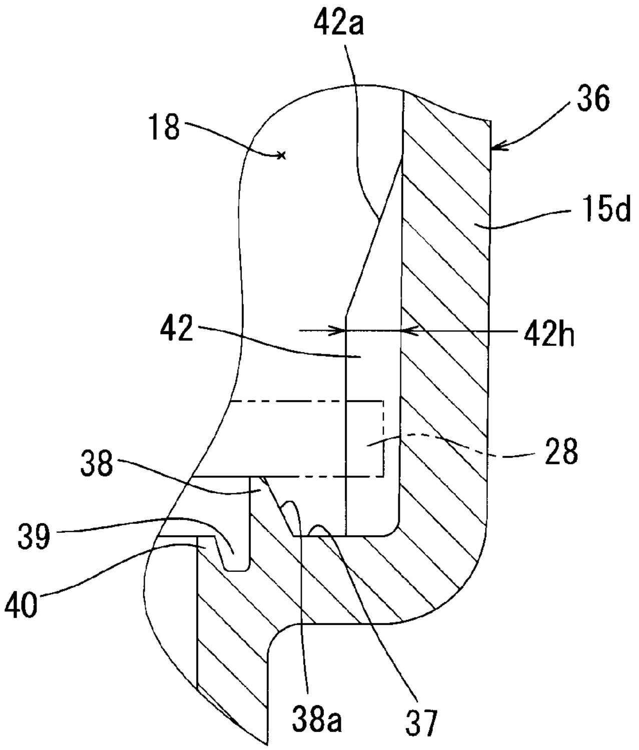
FIG. 5 is a cross sectional view along a line V-V in FIG. 4.

As shown in FIGS. 4 and 5, a ring-shape flat portion 37, a ring weld projection 38, a ring groove 39, and a ring support projection 40 are successively formed from outside to inside in multi-ringed shape on an outer circumferential portion of the bottom wall 16 of the second adsorbent chamber 18. As shown in FIG. 5, the ring weld projection 38 protrudes upwardly relative to the ring-shape flat portion 37. The ring weld projection 38 is configured to have a trapezoidal cross section, and a tapered surface 38*a* is formed on an outer circumferential surface of the ring projection 38. An upper end surface of the ring support projection 40 is located in a plane including the ring-shape flat portion 37. The ring groove 39 is configured to have a U-shape cross section between the ring weld projection 38 and the ring support projection 40.

Two pairs of tentative filter engaging projections 42 arranged in the front-rear direction are formed on both of right and left wall surfaces of the circumferential wall 36 in bilaterally symmetric manner (refer to FIGS. 2 and 3). The tentative filter engaging projections 42 are configured in rib shapes extending along an axial direction (vertical direction in FIG. 5) on an inner wall surface of the circumferential wall 36 in the bottom portion of the second adsorbent chamber 18. The tentative filter engaging projections 42 are configured to have triangular cross section (refer to FIG. 4). As shown in FIG. 5, a projection length (height) 42*h* in a lower portion of the each tentative filter engaging projection 42 relative to the inner wall surface of the circumferential wall 36 is configured such that a circumferential edge of the filter 28 can elastically contact with the each tentative filter engaging projection 42. An inclined surface 42*a* gradually decreasing the projection length (height) 42*h* relative to the inner wall surface of the circumferential wall 36 from a lower side (side of the bottom wall 16) to a upper side (opening side) is formed on an upper portion of the each tentative filter engaging projection 42.

As shown in FIGS. 4 and 5, the filter 28 is formed to have an outer shape similar to and slightly smaller than an inner shape of the circumferential wall 36 of the second adsorbent chamber 18. Thus, it is able to loosely fit the filter 28 with the circumferential wall 36 of the second adsorbent chamber 18. In addition, the circumferential edge of the filter 28 can elastically contact an end portion (projecting end) of the each tentative filter engage portion 42.

The case body 13 is made from, for example, PA66 nylon resin. The filter 28 is made of, for example, nonwoven fabric made from mixed fiber of polyester fiber and rayon fiber.

Next, an assembling step of the filter 28 on the case body 13 will be described in reference to FIGS. 6-10.

Figure 6:
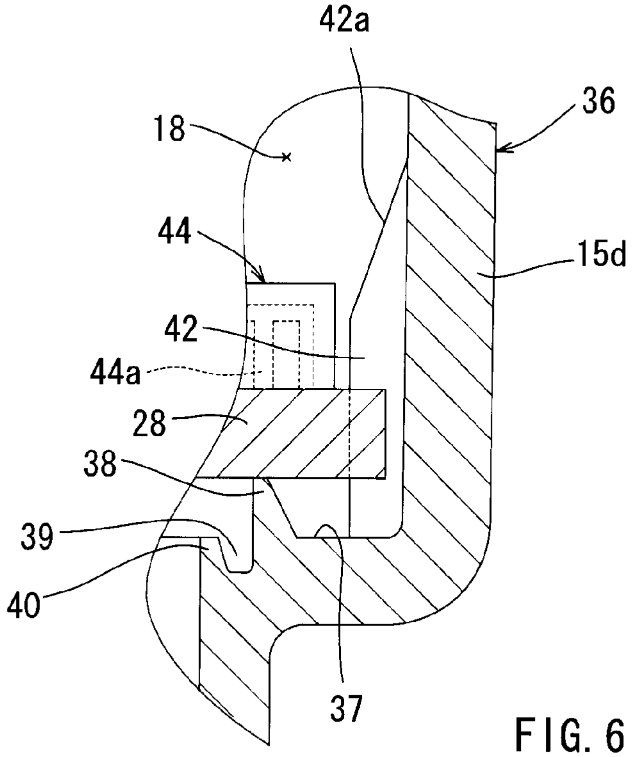
FIG. 6 is a cross sectional view showing a state during installation of a filter on the case body.

Firstly, the filter 28 is loosely fitted within the second adsorbent chamber 18 (in particular, with the circumferential wall 36) as shown in FIG. 6. In this time, in an automated line, the filter 28 is moved in parallel from the upper side to the lower side of the second adsorbent chamber 18 in a state that the filter 28 is tightly fitted by a sucking disk 44 of a suction device (not shown) due to negative pressure, and is located on the ring weld projection 38 of the bottom wall 16. The sucking disk 44 has many suction holes 44*a* opening at a lower surface, so that the filter 28 is tightly fitted at the lower surface of the sucking disk 44 due to negative pressure via the suction holes 44*a*.

With this, the circumferential edge of the filter 28 elastically contacts with the tentative filter engaging projection 42 due to elastic deformation of the circumferential edge. Thus, the filter 28 is tentatively held by the tentative filter engaging projection 42. And then, the negative pressure against the filter 28 is released, the sucking disk 44 is removed to outside of the second adsorbent chamber 18 (refer to FIGS. 7 and 8).

Figure 9:
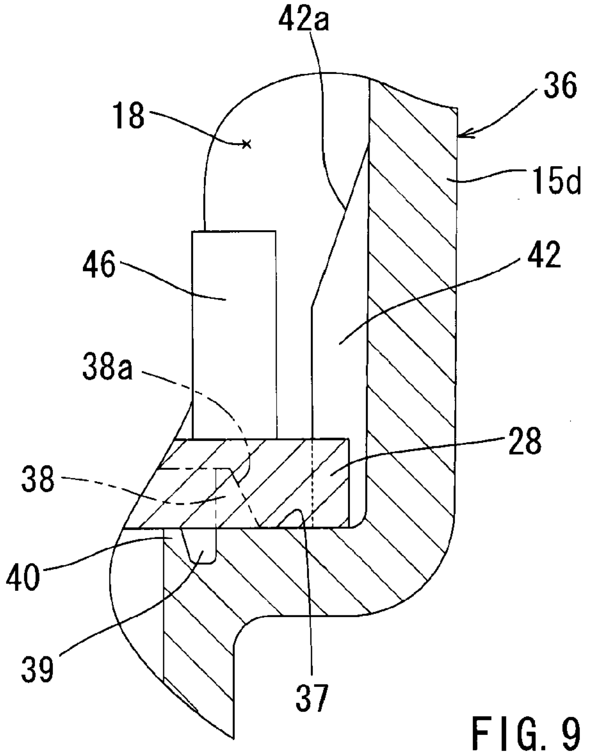
FIG. 9 is a cross sectional view showing a state during welding of the filter on the case body.
Figure 10:
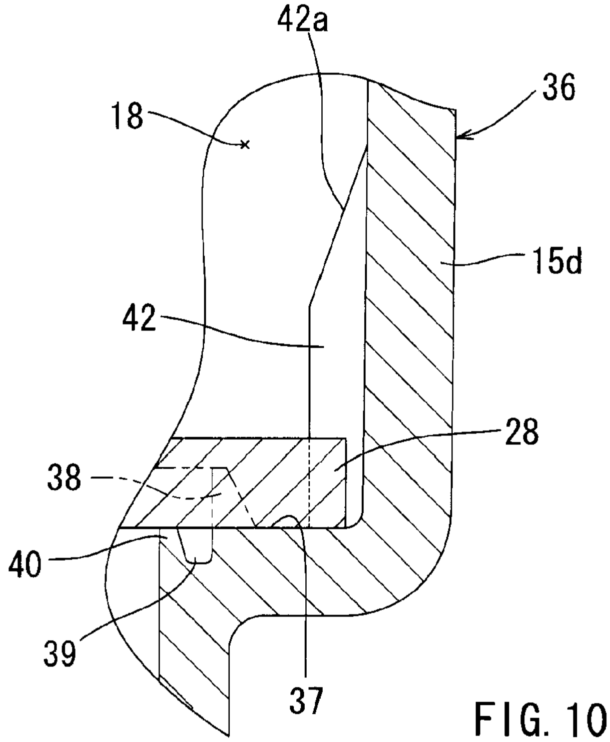
FIG. 10 is a cross sectional view showing a state that the filter is completely welded on the case body.

Then, a weld horn 46 of a vibration welder (not shown) utilizing such as ultrasonic waves is moved in parallel from the upper side to the lower side of the second adsorbent chamber 18, and is pressed on the filter 28 (refer to FIG. 9). In this state, when ultrasonic oscillation is applied to the weld horn 46, the circumferential edge of the filter 28 is welded on the ring weld projection 38 of the bottom wall 16. In this time, the ring weld projection 38 is fallen toward the ring groove 39 due to the tapered surface 38*a*, so that burr generated during welding is received within the ring groove 39. With this, the filter 28 is connected to the ring support projection 40, so that the ring groove 39 is sealed. Then, the ultrasonic oscillation transmitted to the welding horn 46 is stopped, and the weld horn 46 is removed to outside of the second adsorbent chamber 18 (refer to FIG. 10). In addition, the filters 28 are assembled on the compartments 17*a* and 17*b* of the first adsorbent chamber 17 in the same way, respectively.

As described previously, assembling operations of the filters 28 on the case body 13 are completed. As shown in FIG. 1, in the case body 13, each of the adsorbent chambers 17 and 18 is filled with the adsorbent 27, and the buffer plate 30, the press plates 31, the springs 32, the filters 34 and so on are mounted, and then, when the opening of the case body 13 at the upper side is closed with the cover plate 14, the canister 10 is completed.

Figure 7:
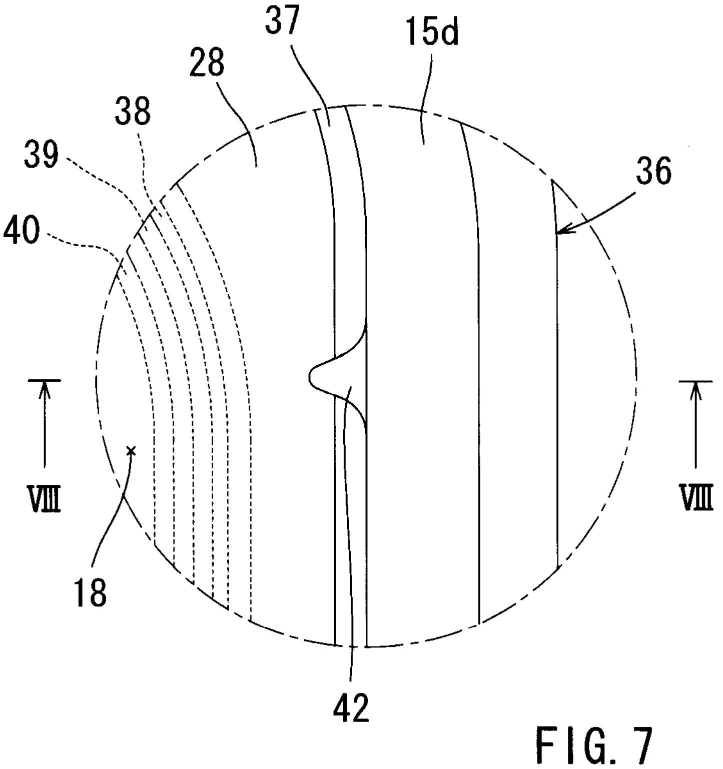
FIG. 7 is a plane view showing a state that the filter is completely installed on the case body.
Figure 8:
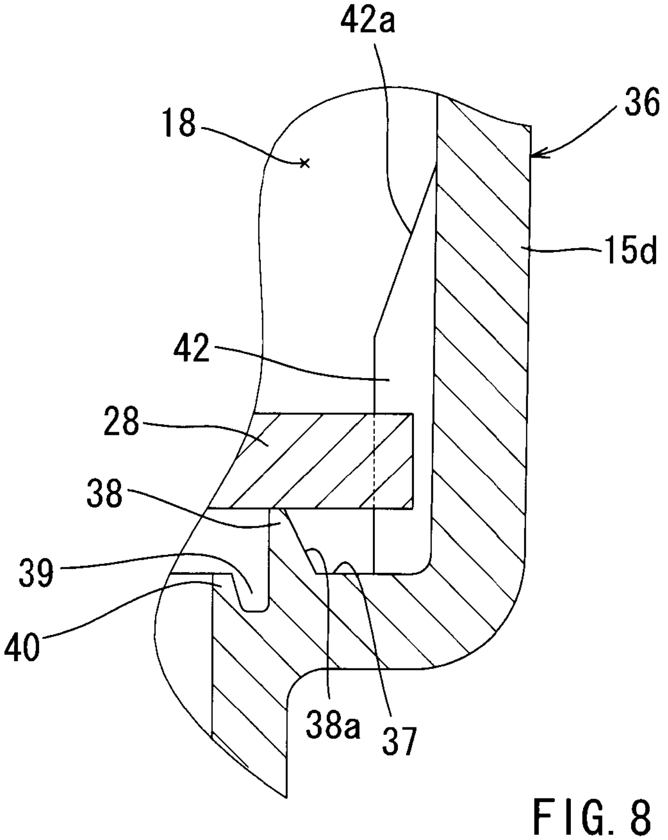
FIG. 8 is a cross sectional view along a line VIII-VIII in FIG. 7.

In accordance with the aforementioned canister 10, in welding of the filter 28 on the bottom wall 16 of the second adsorbent chamber 18 within the canister case 12, when the filter 28 is loosely fitted with the circumferential wall 36 of the second adsorbent chamber 18, the filter 28 is tentatively held by the tentative filter engaging projections 42 (refer to FIGS. 7 and 8). Therefore, it is able to prevent displacement of the filter 28 between the time the filter 28 is located in the second adsorbent chamber 18 and the time the filter 28 is welded. This is effective for reduction of assembly failure of the filter 28 and for simplification of management of the automated line.

The tentative filter engaging projections 42 are formed in a rib shape expending along the axial direction (vertical direction in FIG. 8) on the inner wall surface of the second adsorbent chamber 18. Accordingly, when the filter 28 is loosely fitted within the adsorbent chamber, it is able to easily move the filter 28 in parallel to installation position in a state that the circumferential edge of the filter elastically contacts with the tentative filter engaging projections 42.

Each of the tentative filter engaging projections 42 has the inclined surface 42*a* gradually decreasing the projection length 42*h* relative to the inner wall surface of the second adsorbent chamber 18 from the side of the bottom wall 16 toward the opening side (refer to FIG. 5). Therefore, elastic deformation of the circumferential edge of the filter 28 can smoothly be carried out due to the inclined surfaces 42*a* of the tentative filter engaging projections 42.

The tentative filter engaging projection 42 in the embodiment can be modified according to alternative embodiments as follow.

Figure 11:
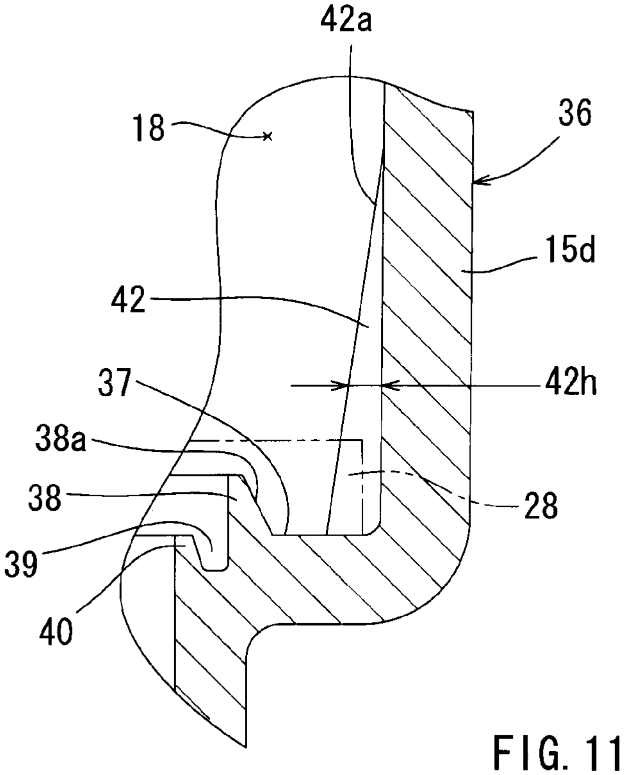
FIG. 11 is a cross sectional view showing a first alternative embodiment of the tentative filter engaging projection.

In a first alternative embodiment, as shown in FIG. 11, the inclined surface 42 of the tentative filter engaging projection 42 is configured to extend over the whole length of the tentative filter engaging projection 42.

Figure 12:
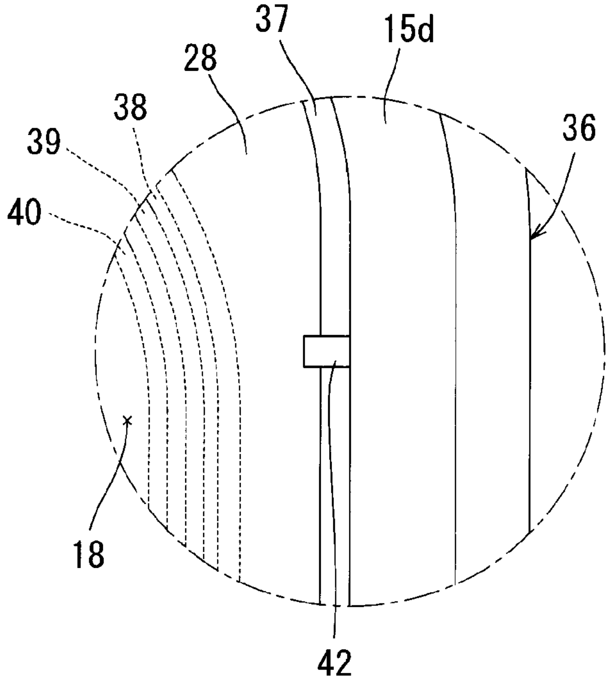
FIG. 12 is a plane view showing a second alternative embodiment of the tentative filter engaging projection.

In a second alternative embodiment, as shown in FIG. 12, the transverse section of the tentative filter engaging projection 42 is configured in a square shape.

Figure 13:
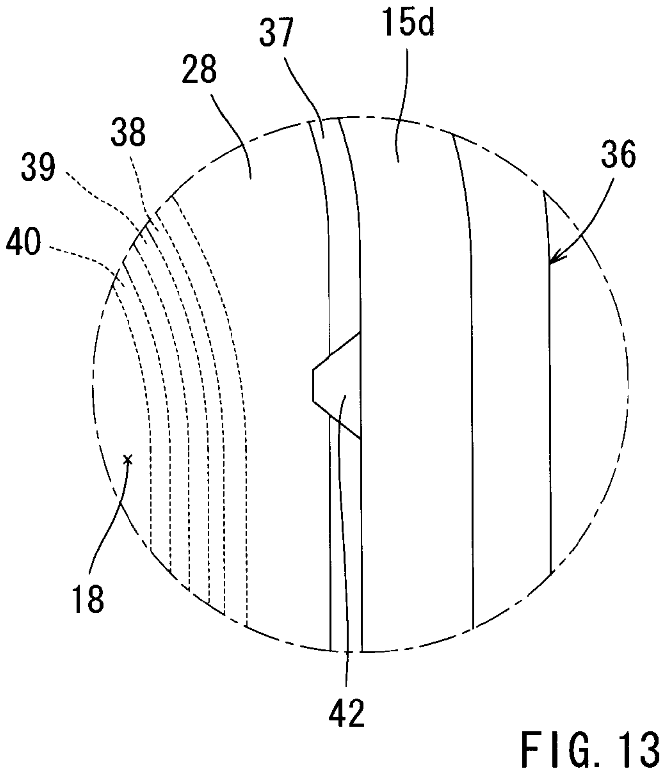
FIG. 13 is a plane view showing a third alternative embodiment of the tentative filter engaging projections.

In a third alternative embodiment, as shown in FIG. 13, the transverse section of the tentative filter engaging projection 42 is configured in a trapezoidal shape.

Figure 14:
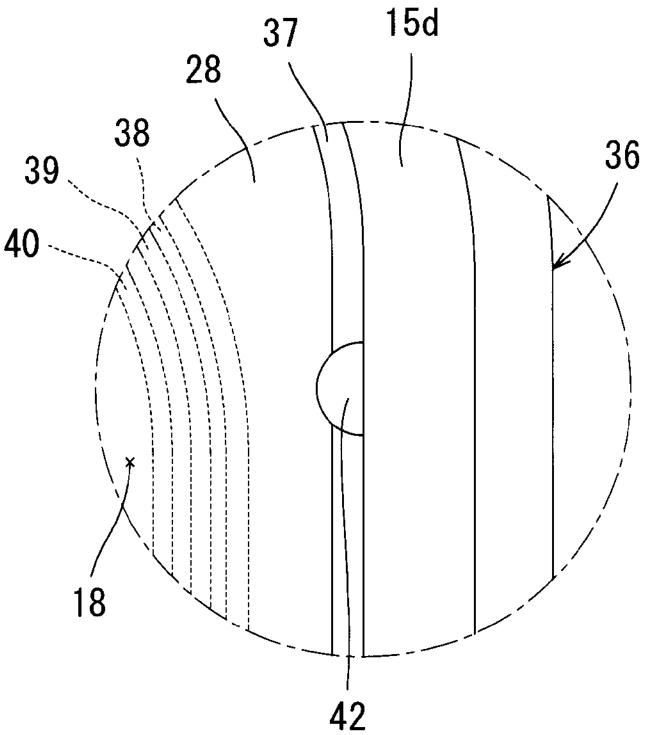
FIG. 14 is a plane view showing a fourth alternative embodiment of the tentative filter engaging projections.

In a fourth alternative embodiment, as shown in FIG. 14, the transverse section of the tentative filter engaging projection 42 is configured in a half circular shape.

Figure 15:
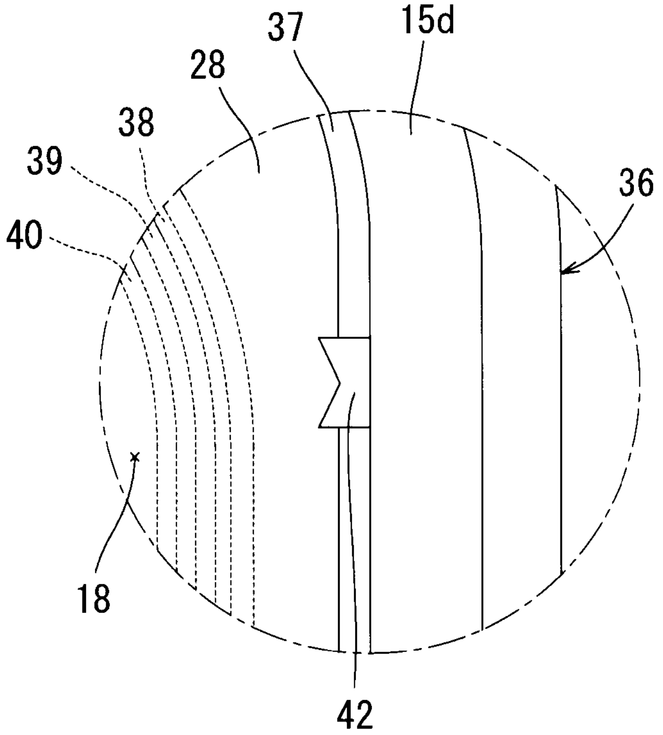
FIG. 15 is a plane view showing a fifth alternative embodiment of the tentative filter engaging projections.

In a fifth alternative embodiment, as shown in FIG. 15, the transverse section of the tentative filter engaging projection 42 is configured in a pentagon shape having a substantial M-shape outline.

Figure 16:
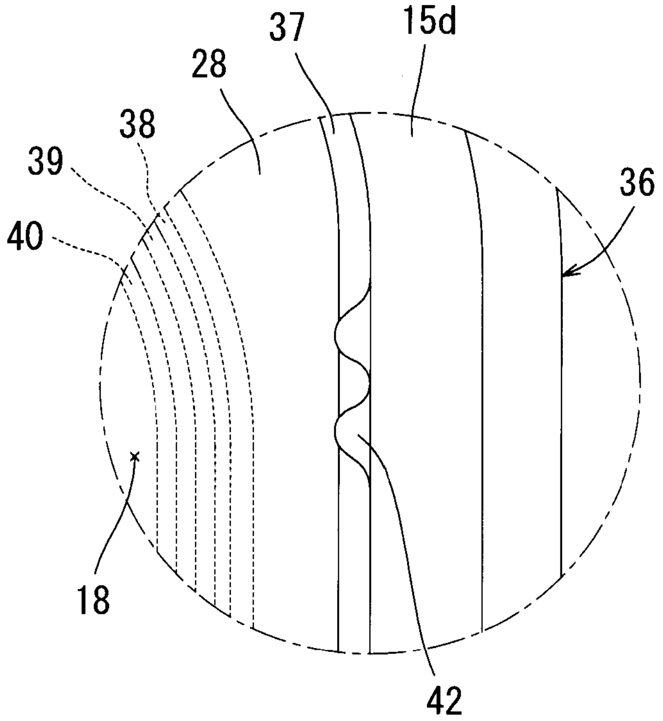
FIG. 16 is a plane view showing a sixth alternative embodiment of the tentative filter engaging projections.

In a sixth alternative embodiment, as shown in FIG. 16, the transverse section of the tentative filter engaging projection 42 is configured in a wave pattern.

The present invention is not limited to the aforementioned embodiments, and can be modified without departing from the scope of the present invention. For example, the tentative filter engaging projection 42 is not limited to the rib shape, and can be modified properly. In addition, the number, position, and configuration, etc. of the tentative filter engaging projections 42 can be changed as necessary. In brief, the tentative filter engaging projections can be replaced with any one of structures capable of tentatively holding the filter loosed fitted within the adsorbent chambers. In the aforementioned embodiments, the tentative filter engaging projections 42 are formed on the circumferential wall 36, however the tentative filter engaging projections 42 can be configured to protrude from the bottom wall 16. In addition, in the embodiments, the assembly structures of the filters 28 on three adsorbent chamber (including the compartments), that is, the each compartment 17*a* and 17*b* of the first adsorbent chamber 17 and the second adsorbent chamber 18 in the case body 13 are same, however, at least one of the assembly structures of the filters 28 on the adsorbent chambers may be different from others. The number of the adsorbent chambers in the case body 13 can be changed as necessary. The present invention can be applied to an assembly structure of the filter 28 on the cover plate 14 as well as the assembly structure of the filter 28 on the case body 13.

The invention claimed is:

1. A canister comprising:

a canister case having an adsorbent chamber;

an adsorbent housed in the adsorbent chamber of the canister case;

a filter disposed between the adsorbent chamber and a port mounted on an end wall of the adsorbent chamber, and adapted to be loosely fitted within the adsorbent chamber in welding of the filter; and a tentative filter engaging projection provided in the adsorbent chamber for tentatively holding the filter loosely fitted within the adsorbent chamber;

wherein the tentative filter engaging projection is formed in a rib shape extending along an axial direction on an inner wall surface of the adsorbent chamber; and wherein the extending length of the tentative filter engaging portion from the inner wall surface is set such that a circumferential edge of the filter can elastically contact with the tentative filter engaging portion.

2. The canister as in claim 1, wherein the tentative filter engaging projection has an inclined surface gradually decreasing a projection length of the tentative filter engaging projection relative to the inner wall surface of the adsorbent chamber in a direction toward an opening.

3. A canister comprising:

a canister case;

an adsorbent chamber formed in the canister case and adapted to be filled with adsorbent;

a filter positioned in said adsorbent chamber; and at least one tentative filter engaging projection provided in the adsorbent chamber for holding the filter;

wherein the adsorbent chamber has an opening, an end wall opposed to the opening, and side walls;

wherein the tentative filter engaging projection extends from the end wall toward the opening along one of the side walls;

the extending length of the tentative filter engaging projection from the side walls is set such that a circumferential edge of the filter can elastically contact with the tentative filter engaging portion.

4. The canister as in claim 3, wherein the tentative filter engaging projection has an inclined part gradually decreasing a projection length of the tentative filter engaging projection relative to the side wall in a direction toward the opening.

5. A canister comprising:

a canister case having an adsorbent chamber;

an adsorbent housed in the adsorbent chamber of the canister case;

a filter disposed between the adsorbent chamber and a port mounted on an end wall of the adsorbent chamber; and a tentative filter engaging projection provided in the adsorbent chamber for holding the filter adjacent a ring weld projection.

6. The canister as in claim 5, wherein the tentative filter engaging projection is formed in a rib shape extending along an axial direction on an inner wall surface of the adsorbent chamber.

7. The canister as in claim 6, wherein the tentative filter engaging projection has an inclined surface gradually decreasing a projection length of the tentative filter engaging projection relative to the inner wall surface of the adsorbent chamber in a direction toward an opening.

8. The canister as in claim 5, wherein the tentative filter engaging projection has a sectional shape substantially similar to a square.

9. The canister as in claim 5, wherein the tentative filter engaging projection has a sectional shape substantially similar to a trapezoid.

10. The canister as in claim 5, wherein the tentative filter engaging projection has a sectional shape substantially similar to a half circle.

11. The canister as in claim 5, wherein the tentative filter engaging projection has a sectional shape substantially similar to a pentagon.

12. The canister as in claim 5, wherein the tentative filter engaging projection has a sectional shape substantially similar to a wave pattern.

13. A canister comprising:

a canister case;

an adsorbent chamber formed in the canister case and adapted to be filled with adsorbent;

a filter positioned in said adsorbent chamber; and at least one tentative filter engaging projection provided in the adsorbent chamber for holding the filter;

wherein the adsorbent chamber has an opening, an end wall opposed to the opening, and side walls;

wherein the tentative filter engaging projection extends in a rib shape from the end wall toward the opening along one of the side walls; and wherein the size of the filter is set such that a circumferential edge of the filter can elastically contact with the tentative filter engaging portion when the filter is held by the tentative filter engaging portion.

* * * * *